United States Patent Office 3,144,449
Patented Aug. 11, 1964

---

1

3,144,449
ISOXAZOLO-ANDROSTAN-17β-OL DERIVATIVES
Albert Bowers and John Edwards, both of Mexico City, Mexico, assignors, by mesne assignments, to Syntex Corporation, a corporation of Panama
No Drawing. Filed Aug. 3, 1961, Ser. No. 128,973
20 Claims. (Cl. 260—239.55)

The present invention relates to novel cyclopentanophenanthrene compounds and to a process for the production thereof.

More particularly the present invention relates to isoxazolo(5′,4′;2,3) and isoxazolo(3′,4′;2,3)-androstan-17β-ol derivatives.

The novel compounds of the present invention which are potent anabolic-androgenic agents with a particularly favourable anabolic-androgenic ratio, possess anti-estrogenic, anti-gonadotropic, and blood cholesterol lowering activities, depress the action of the pituitary gland and exhibit anti-fibrillatory action, are represented by the following formulas:

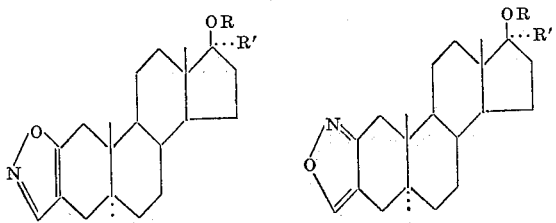

In the above formulas, R represents hydrogen or a hydrocarbon carboxylic acyl group containing less than 12 carbon atoms, and $R^1$ may be hydrogen or an alkyl, alkenyl or alkinyl group containing up to 8 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy, containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

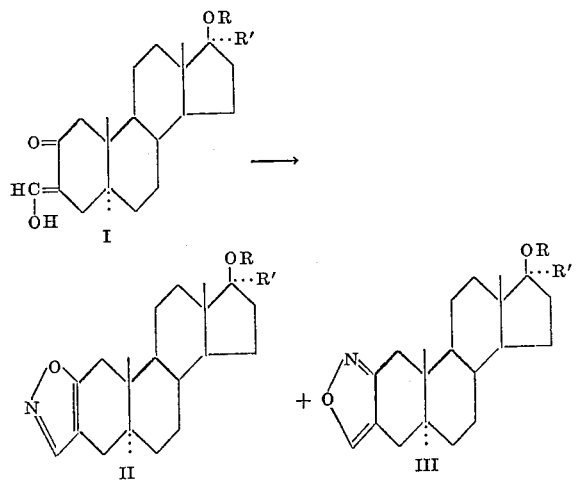

In the above formulas R and $R^1$ have the same meaning as previously defined.

2

In practicing the process outlined above, the starting 3 - hydroxymethylene-androstan-17β-ol-2-one derivative (I) as described in the copending U.S. Patent application Serial No. 128,362, filed August 1, 1961, is treated with a solution of hydroxylamine hydrochloride and sodium acetate in a suitable solvent such as ethanol, for a period of time of the order of 18 hours, affording two products which after separation, preferably by silica gel chromatography, give the corresponding isoxazolo (5′,4′;2,3)-androstan-17β-ol derivative and isoxazolo (3′,4′;2,3)-androstan-17β-ol derivative.

The following specific examples serve to illustrate but are not intended to limit the scope of the present invention:

Example I

A mixture of 1 g. of hydroxylamine hydrochloride and 1 g. of anhydrous sodium acetate in 25 cc. of ethanol was left standing for 15 minutes and then the precipitate of sodium chloride was filtered off. The filtrate was added to a mixture of 3 g. of 3-hydroxy-methylene-androstan-17β-ol-2-one and 25 cc. of ethanol and the resulting mixture refluxed for 18 hours. The greater part of the solvent was removed, water added and the product extracted with methylene chloride. The organic extract was washed with water, dried over sodium sulfate and evaporated to dryness. The resulting product was dissolved in 30 cc. of benzene and adsorbed on 120 g. of silica gel. Two products were obtained by elution with mixtures of benzene and increasing amounts of ether. Crystallization of these products from ethyl acetate afforded isoxazolo (5′,4′;2,3)-androstan-17β-ol and isoxazolo(3′,4′;2,3)-androstan-17β-ol.

Example II 3 g. of 3-hydroxymethylene-17α-methyl-androstan-17β-ol-2-one were treated following the technique of the foregoing example furnishing isoxazolo (5′,4′;2,3)-17α-methyl-androstan-17β-ol and isoxazolo (3′4′;2,3)-17α-methyl-androstan-17β-ol.

By the same procedure were treated 3-hydroxymethylene - 17α-methyl-androstan-17β-ol-2-one-17-acetate, and 3 - hydroxymethylene-17α-methyl-androstan-17β-ol-2-one-17 - propionate, giving correspondingly isoxazolo (5′,4′;2,3) - 17α - methyl-androstan-17β-olo-17-acetate, isoxazolo (3′,4′;2,3)-17α-methyl-androstan-17β-ol-17-acetate, isoxazolo (5′4′;2,3) - 17α-methyl-androstan-17β-ol-17 - propionate, and isoxazolo (3′,4′;2,3)-17α-methyl-androstan-17β-ol-17-propionate.

Example III 1 g. of 3-hydroxymethylene-17α-vinyl-androstan-17β-ol-2-one was treated in accordance with Example I, affording isoxazolo (5′,4′;2,3)-17α-vinyl-androstan-17β-ol, and isoxazolo (3′4′;2,3)-17α-vinyl-androstan-17β-ol.

Following the same technique were treated 3-hydroxymethylene - 17α-vinyl-androstan-17β-ol-2-one-17-acetate, and 3 - hydroxymethylene-17α-vinyl-androstan-17β-ol-2-one - 17-caproate, affording correspondingly isoxazolo (5′,4′;2,3) - 17α-vinyl-androstan-17β-ol-17-acetate, isoxazolo (3′,4′;2,3) - 17α-vinyl-androstan-17β-ol-17-acetate, isoxazolo (5′,4′;2,3) - 17α-vinyl-androstan-17β-ol-17-caproate, and isoxazolo (3′,4′;2,3)-17α-vinyl-androstan-17β-ol-17-caproate.

Example IV 2 g. of 3-hydroxymethylene-17α-ethinyl-androstan-17β-ol-2-one was treated using the same conditions described in Example I, furnishing isoxazolo (5′,4′;2,3)-17α-ethinyl-androstan - 17β-ol and isoxazolo (3′,4′;2,3)-17α-ethinyl-androstan-17β-ol.

Using the same conditions were treated 3-hydroxymethylene - 17α-ethinyl-androstan-17β-ol-2-one-17-propionate and 3 - hydroxymethylene-17α-ethinyl-androstan-17β-ol-2-one-17-cyclopentylpropionate, affording correspondingly isoxazolo (5',4';2,3)-17α-ethinyl-androstan-17β-ol-17-propionate, isoxazolo (3',4';2,3)-17α-ethinyl-androstan-17β-ol-17-propionate, isoxazolo (5',4';2,3)-17α-ethinyl - androstan-17β-ol-17-cyclopentylpropionate, and isoxazolo (3',4';2,3)-17α - ethinyl - androstan-17β-ol-17-cyclopentylpropionate.

When applying the same technique to 3-hydroxymethylene - 17α - ethinyl-androstan-17β-ol-2-one-17-caproate there were obtained isoxazolo (5',4';2,3)-17α-ethinyl-androstan-17β-ol-17-caproate and isoxazolo (3',4';2,3)-17α-ethinyl-androstan-17β-ol-17-caproate.

We claim:

1. A compound of the following formula:

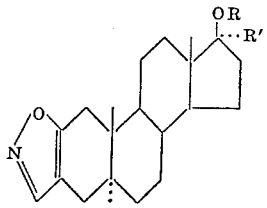

wherein R is selected from the group consisting of hydrogen and a hydrocarbon carboxylic acyl group of less than 12 carbon atoms; and $R^1$ is selected from the group consisting of hydrogen, an alkyl group, and alkenyl group, and an alkynyl group each containing less than 8 carbon atoms.

2. Isoxazolo (5',4';2,3)-androstan-17β-ol.
3. Isoxazolo (5',4';2,3)-17α-methyl-androstan-17β-ol.
4. Isoxazolo (5',4';2,3)-17α-methyl-androstan-17β-ol-17-acetate.
5. Isoxazolo (5',4';2,3)-17α-vinyl-androstan-17β-ol-17-acetate.
6. Isoxazolo (5',4';2,3)-17α-vinyl-androstan-17β-ol-17-caproate.
7. Isoxazolo (5',4';2,3)-17α-ethynyl-androstan-17β-ol-17-caproate.
8. Isoxazolo (5',4';2,3)-17α-ethynyl-androstan-17β-ol-17-propionate.
9. Isoxazolo (5',4';2,3)-17α-ethynyl - androstan-17β-ol-cyclopentylpropionate.

10. A compound of the following formula:

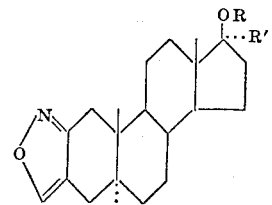

wherein R is selected from the group consisting of hydrogen and a hydrocarbon carboxylic acyl group of less than 12 carbon atoms, and $R^1$ is selected from the group consisting of hydrogen, an alkyl group, an alkenyl group and an alkynyl group each containing less than 8 carbon atoms.

11. Isoxazolo (3',4';2,3)-androstan-17β-ol.
12. Isoxazolo (3',4';2,3)-17α-methyl-androstan-17β-ol.
13. Isoxazolo (3',4';2,3)-17α-methyl-androstan-17β-ol-17-acetate.
14. Isoxazolo (3',4';2,3) - 17α-vinyl-androstan-17β-ol-17-acetate.
15. Isoxazolo (3',4';2,3) - 17α-vinyl-androstan-17β-ol-17-caproate.
16. Isoxazolo (3',4';2,3)-17α-ethynyl-androstan-17β-ol-17-caproate.
17. Isoxazolo (3',4';2,3)-17α-ethynyl-androstan-17β-ol-17-propionate.
18. Isoxazolo (3',4';2,3)-17α-ethynyl-androstan-17β-ol-17-cyclopentylpropionate.

19. A process for the production of a compound selected from the group consisting of isoxazolo (5',4';2,3)-androstan-17β-ol-3-one and isoxazolo (3',4';2,3)-androstan-17β-ol which comprises treating the corresponding 3 - hydroxymethylene-androstan-17β-ol-2-one derivative with a solution of hydroxylamine hydrochloride and an alkali metal acetate in a suitable solvent.

20. The process of claim 19 wherein the alkali metal acetate is sodium acetate and the solvent is ethanol.

References Cited in the file of this patent

Zderic et al.: Chemistry and Industry, December 31, 1960, pp. 1625–26.

Clinton et al.: J. Org. Chem., vol. 26, January 1961, page 279.